(No Model.) 2 Sheets—Sheet 1.
M. LANG.
MACHINE FOR MOLDING MARBLES OR OTHER ARTICLES FROM CLAY, &c.
No. 485,282. Patented Nov. 1, 1892.
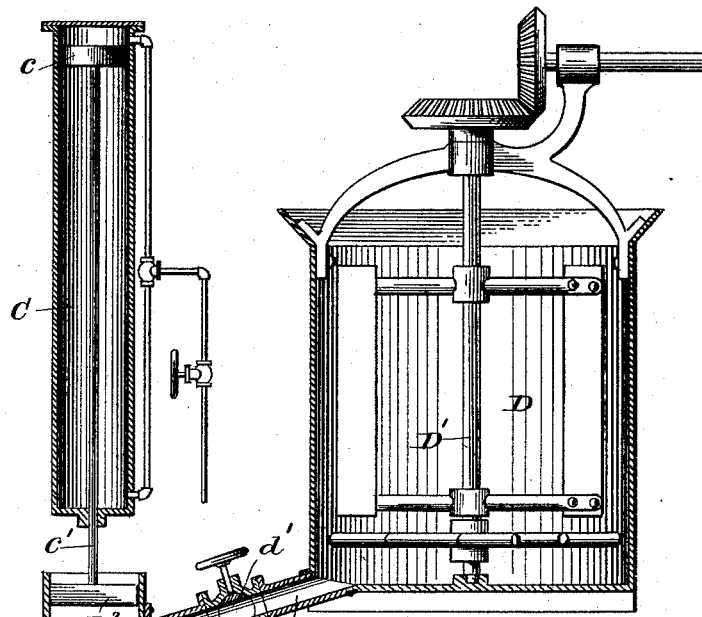
-FIG. I-
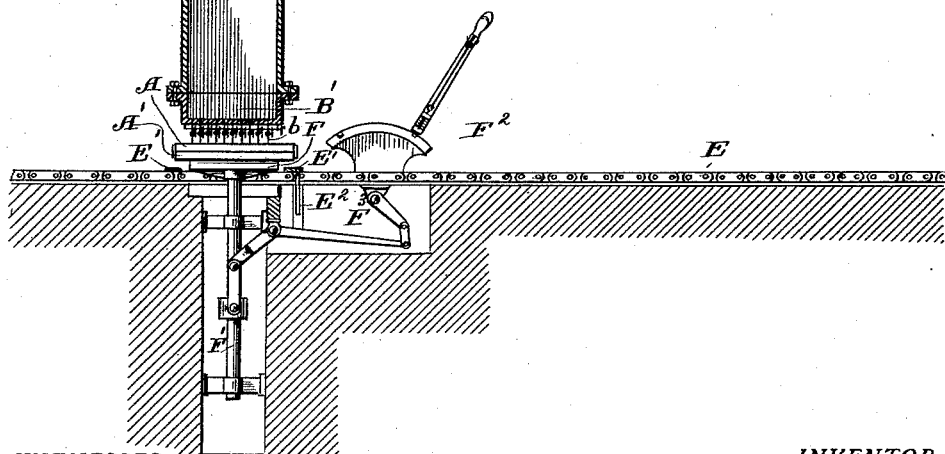
WITNESSES:
J. C. Turner
Wm Lecher
INVENTOR.
Matthew Lang
BY
Hall and Fay
ATTORNEYS.

(No Model.) 2 Sheets—Sheet 2.
M. LANG.
MACHINE FOR MOLDING MARBLES OR OTHER ARTICLES FROM CLAY, &c.
No. 485,282. Patented Nov. 1, 1892.
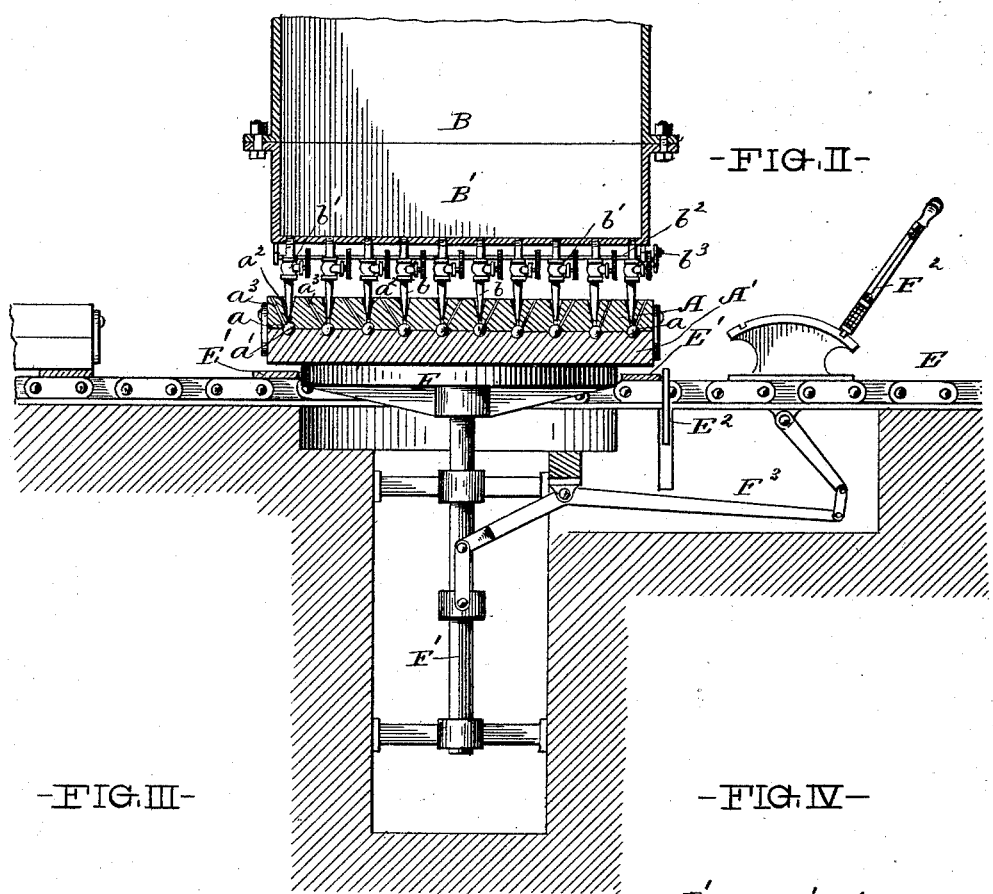
-FIG. II-
-FIG. III-
-FIG. IV-
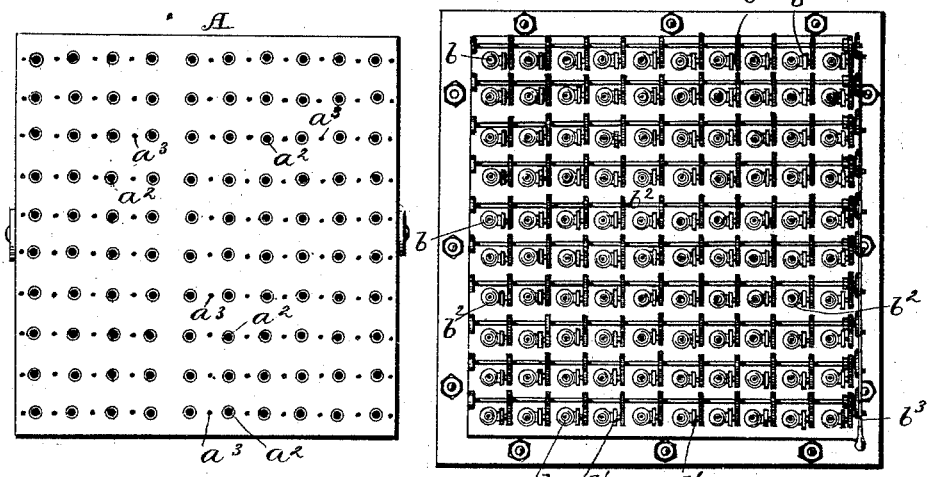
WITNESSES:
J. C. Turner
Wm Lecher
INVENTOR.
Matthew Lang
BY
Hall and Fay
ATTORNEYS.

UNITED STATES PATENT OFFICE.

MATTHEW LANG, OF EAST AKRON, OHIO.

MACHINE FOR MOLDING MARBLES OR OTHER ARTICLES FROM CLAY, &c.

SPECIFICATION forming part of Letters Patent No. 485,282, dated November 1, 1892.

Application filed November 19, 1891. Serial No. 412,372. (No model.)

*To all whom it may concern:*

Be it known that I, MATTHEW LANG, a citizen of the United States, and a resident of East Akron, county of Summit, and State of Ohio, have invented certain new and useful Improvements in Machines for Molding Marbles or other Articles from Clay or other Plastic Material, of which the following is a specification, the principle of the invention being herein explained and the best mode in which I have contemplated applying that principle so as to distinguish it from other inventions.

The annexed drawings and the following description set forth in detail one mechanical form embodying the invention, such detail construction being but one of various mechanical forms in which the principle of the invention may be used.

In such annexed drawings, Figure I represents a section of the entire machine for making marbles or other articles from clay or other plastic substance; Fig. II, a section on an enlarged scale of the lower end of the distributing-receptacle and the mechanism for filling and operating the molds; Fig. III, a top plan view of the mold; and Fig. IV, a plan view of the under side of the distributing-receptacle, illustrating the arrangement of the distributing-nozzles.

In said drawings, the letters A A' indicate the two mold-halves, which are formed with the mold-cavities $a$ $a'$, one-half of each cavity being formed in one-half of the mold, and the complete cavities corresponding in shape to the shape of the articles to be formed, such articles being in the drawings illustrated as spheres, so-called "marbles," for the manufacture of which my machine is especially adapted, although it may be employed in the manufacture of any articles capable of being molded from plastic material. The upper mold-half A has gates $a^2$, preferably formed downwardly tapering, and vent-holes $a^3$, opening from the mold-cavities through the surface of the mold.

The distributing-receptacle B for the plastic material to be molded is provided at its lower end with a cap B', which preferably corresponds in shape to the shape of the receptacle and to the shape of the mold, and is removably secured to the lower end of the receptacle. A number of nozzles $b$ are secured in the bottom of the cap, corresponding in their positions in said bottom to the positions of the gates in the mold, and said nozzles are usually provided with cocks or cut-offs $b'$, the stems of which are preferably connected by suitable devices—such as shafts $b^2$—connected to revolve the cocks and united by means of a rod and handle $b^3$, so as to be simultaneously opened or shut.

A piston or plunger $B^2$ slides in the distributing-receptacle and is connected to a suitable device for raising and lowering it in the receptacle—such as a steam or hydraulic cylinder C—the piston $c$ of which is connected by a piston-rod $c'$ to the plunger. The cylinder is provided with suitable ports and valves for admitting and exhausting the actuating fluid at the ends of the cylinder, raising or lowering the piston and plunger.

A mixing-receptacle D is supported above the distributing-receptacle, has a rotary or other suitable stirrer D', and is provided with an outlet-tube $d$ at its bottom, which tube enters the upper end of the distributing-receptacle and is provided with a suitable gate $d'$ for controlling the flow of material from the mixing-receptacle into the distributing-receptacle.

The molds are conveyed beneath the distributing-receptacle upon an endless conveyer E, having cross-pieces E', upon which the molds rest. The movement of the conveyer is intermittent, the conveyer being stopped while a mold is being filled, and a suitable movable stop $E^2$ is arranged so as to bear against a cross-piece, and the forward end of a mold when it is raised being at the same time suitably connected to the moving mechanism of the conveyer, so that the conveyer will be stopped prior to the raising of the stop. This stop serves to trim the mold upon the conveyer, so that it may have its gates registering with the nozzles at the same time it retains the conveyer in its stopped position.

An elevating device is arranged beneath the conveyer to register with the distributing-reservoir, and consists of a platform F, which may support a mold and pass up between two cross-pieces of the conveyer. The platform is supported upon a vertically-sliding rod F', which may be raised and lowered by means of a hand-lever F² and suitable intermediate lever connection F³, so that when the mold is stopped beneath the distributing-nozzles the mold may be raised from the conveyer by the hand-lever and the gates of the mold pushed upward upon the nozzles.

In practice, when marbles or other articles are to molded from clay, the clay is stirred and mixed with water in the mixing-receptacle usually until it assumes a thin, even, plastic consistency, about the consistency of so-called "slip," or any other consistency suitable to the work to be done, and this slip is then emptied into the distributing-receptacle, in which the plunger has been raised above the opening of the outlet-tube from the mixing-receptacle. When the gate in said tube has been closed and the mold raised upon the nozzles, the plunger is depressed and will force the slip through the nozzles, the cocks of which are opened, into the mold-cavities, from which the air will be driven out by the entering slip and will escape through the air-vents. When the slip begins to flow out through said vents, the mold-cavities are full, the plunger is stopped, the cocks of the nozzles are closed, the mold is lowered, the conveyer is again started, and when another mold arrives beneath the nozzles the operation may be repeated.

It is obvious that other articles besides marbles may be molded by this machine, the only change necessary being in the shape of the mold-cavities and, perhaps, in the arrangement of the vents.

Other plastic material besides clay may be used, the distributing-receptacle and nozzles and the mold being changed to the character of the material.

The mold may be used alone without the distributing-nozzles, the material being poured in by hand.

Other modes of applying the principle of my invention may be employed for the mode herein explained. Change may therefore be made as regards the mechanism herein set forth, provided the principles of construction respectively recited in the following claims are employed.

I therefore particularly point out and distinctly claim as my invention—

1. In a machine for molding articles from plastic material, a distributing-receptacle provided with a nozzle and a mold having a correspondingly-shaped registering gate into which said nozzle may snugly fit and find a tight seat, substantially as set forth.

2. In a machine for molding articles from plastic material, a distributing-receptacle provided with a nozzle, and a mold having a correspondingly-shaped registering gate into which said nozzle may fit tightly, and a vent-opening for the outlet of air and overflow of material cut off by said tight fit in the gate, substantially as set forth.

3. In a machine for molding articles from plastic material, a distributing-receptacle having a number of nozzles in its bottom provided with connected cocks and a mold having a corresponding and registering number of gates shaped corresponding to the nozzles, so as to form tight seats for the latter, substantially as set forth.

4. In a machine for molding articles from plastic material, a distributing-receptacle formed with parallel sides and provided with nozzles in its bottom, a plunger within the receptacle, and a mold having gates corresponding and registering with the nozzles and shaped to correspond to and form tight seats for the latter, substantially as set forth.

5. In a machine for molding articles from plastic material, a distributing-receptacle having nozzles in its bottom, a mold having gates registering with and corresponding to said nozzles, a conveyer beneath said receptacle and adapted to convey the mold, and an elevator beneath the conveyer and adapted to raise the mold to the nozzles, substantially as set forth.

6. In a machine for molding articles from plastic material, a mixing-receptacle, a distributing-receptacle connected to said mixing-receptacle by a tube, a reciprocating plunger in the distributing-receptacle, a mold, a conveyer for said mold, and an elevator for said mold and registering with the distributing-receptacle, substantially as set forth.

In testimony that I claim the foregoing to be my invention I have hereunto set my hand this 9th day of November, A. D. 1891.

MATTHEW LANG.

Witnesses:
JAMES LANG,
JACOB GOODMAN.